Oct. 28, 1924.

E. L. BAUMANN ET AL 1,513,024

REAMER HEAD

Filed June 24, 1920

Inventors:
Emil Leonhard Baumann
Hermann Schumacher

Oct. 28, 1924.  1,513,024
E. L. BAUMANN ET AL
REAMER HEAD
Filed June 24, 1920  2 Sheets-Sheet 2

Inventors:

Patented Oct. 28, 1924.

1,513,024

UNITED STATES PATENT OFFICE.

EMIL LEONHARD BAUMANN, OF MUNICH-GLADBACH, AND HERMANN SCHUMACHER, OF NEUSS, GERMANY.

REAMER HEAD.

Application filed June 24, 1920. Serial No. 391,519.

*To all whom it may concern:*

Be it known that we, EMIL LEONHARD BAUMANN and HERMANN SCHUMACHER, citizens of the German Republic, and residents of Munich-Gladbach, Germany, and Neuss, Germany, respectively, have invented certain new and useful Improvements in Reamer Heads, of which the following is a specification.

Our invention relates to a tool by means of which bores of large diameter may be finished in one operation accurately true to the required measure, and perfectly smooth without any particular skill on the part of the workman, and this in considerably less time than was hitherto possible by means of the known type of tools of this kind.

The invention is based on the fact that plain surfaces of metal objects can easily be worked up by hand—within certain limits—by using especially shaped scrapers, cutters or the like, and utilizing a pressure of the left hand to act similarly to an elastic weight, while the right hand, firmly resting on the working surface, draws the tool, so that an uniform cut and hence a smooth surface is obtained.

According to this principle the blades of the reamer head are fixed to adjustable levers, in consequence of which, by means of springs or stops, they can be forced or pressed against the inner face of the bore during the operation of the device and be subsequently retracted from the smooth bore surface, when the operation is completed, this by a special device, in order to prevent said surface from being damaged while the tool proper is being removed from the bore.

The levers, with the blades, are so arranged that these latter will practically be trailed along by the joint of the levers when the reamer is turned. By means of adjustable stops the outwardly directed motion of the blades is duly limited so that they are enabled to finish the bore to an exactly determined diameter.

For the purpose of accurately centering the tool within the bore, especially in case the tool is disposed horizontally, there are provided guide blocks of hard wood, adapted to be displaced radially with respect to the reamer head. The improved tool can also carry a cutter-head with adjustable cutters for turning the bore in preliminary way before the reamer is used to finish the bore.

Two embodiments of the subject matter of our invention are shown by way of example in the drawings, affixed to this specification and forming part thereof:

In the drawings are affixed:

Fig. 1 is an axial section of the tool on the bar carrying it and of a gauge fitted on the tool for the purpose of setting the cutters, Fig. 2 a front view of the reamer head, partly in section, the inner face of the work piece to be finished being indicated by dash- and dot-lines in order to denote the position assumed by the various parts of the tool relatively to the work piece.

Fig. 2ª a modification of the construction according to Fig. 1 on a somewhat larger scale.

Fig. 3 a diagrammatic view showing the method of setting the different tools relatively to the blades of the reamer assuming all the cutters had been turned out of their actual position into the projection plane of the blade.

The tool consists of a cutter head and a reamer head. Both these parts are mounted on the free end of the driving spindle or else on a boring bar 2, and are rigidly fixed thereto by means of a key and groove.

Figure 1:
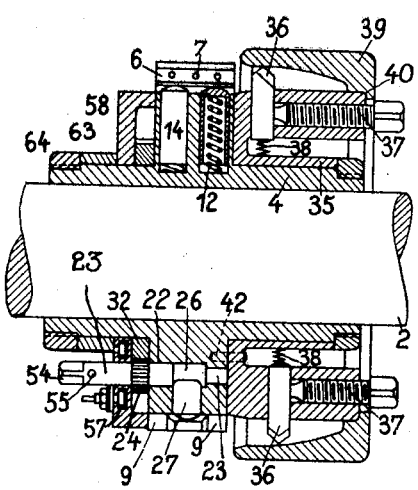
Figure 2:
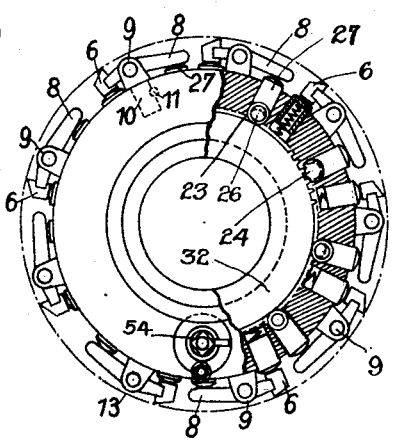

On the circumference of the base body or support 4 (Fig. 1) forming a part of the reamer head, there are disposed a plurality of spring pressed blades 6. These blades are fixed in any suitable manner, say, by screws 7, to the lever 8 (Fig. 2). The said supports are rotably held by the ends of bolts 10 (Fig. 2) inserted on radially disposed bores formed in the support 4 of the reamer head said ends being so shaped as to constitute joints 9.

The bolts 10 are secured in their position by means of pins 11: on these pins being taken out, parts 8, 10 serving to support the blade may then be removed from the support 4. This operation is required in order to enable the blades to be ground or else to be renewed.

The blades 6 are forced against the working face of the work piece by the lever 8 being so constructed as to be spring pressed.

The rear end of the two armed lever 8 rests on a bolt 27. Disposed at right angles to each of these bolts there is provided a bore 22 in the support 4 (Fig. 1), into which there is inserted a bolt 23. The central portion 26 of this latter, on which the bolt 27 is caused to rest, is eccentrically disposed.

The end of bolt 23 projecting from the support 4 carries a tooth wheel 24 engaging a rim 32 toothed on its outer circumference. This rim, for its part, is rotatably disposed on the support 4, and may be readily displaced from without by one of the several bolts 23, say the lowest of the set in Figs. 1 and 2, being made to extend beyond the tooth wheel 24, and by its being provided at its free end with a square 54 or the like, so that it may be rotated by means of a wrench. Each time this rotation is effected, it is transmitted by means of the toothed rim 32 on to the rest of the bolts 23, whereby all the bolts are caused to be rotated in one and the same manner.

According to the extent to which the toothed rim 32 is rotated relatively to the spindle 2, bolts 27 will be caused to project to a greater or less degree from the support 4. However, the adjustment of the toothed rim also affects that of the lever 8, as thereby the terminal position is determined up to which the blades 6 may be forced out. This gives the possibility of so settling the blades that the bore in the work piece will not be finished beyond the diameter desired. On the other hand, the blades 6 may be easily retracted from the wall surface of the work piece, after the operation has been finished, and brought up closely against the support 4. For this particular purpose, it will prove necessary to so rotate the toothed rim 32 that the bolts 27 will be forced still farther out from the support 4. Thereupon, the lever 8 is set as required.

Another modification is shown by the Fig. 2$^a$. With this modification the blade 6 is forced outward by a bolt 23$^a$ with an excentrically disposed head 26$^a$ acting upon a short bolt or pin 27$^a$ and the lever 8 is under pressure of a spring 12$^a$. It is true that by this arrangement the blades cannot yield during operation but are quickly brought out of engagement with the work piece by action of the spring 12$^a$ as soon as the toothed rim 32$^a$ is rotated by one of the bolts 23$^a$ by means of the tooth wheels 24$^a$.

The provision of a key and groove secures the taking along of the support or reamer body in the rotation of the spindle.

Figure 4:
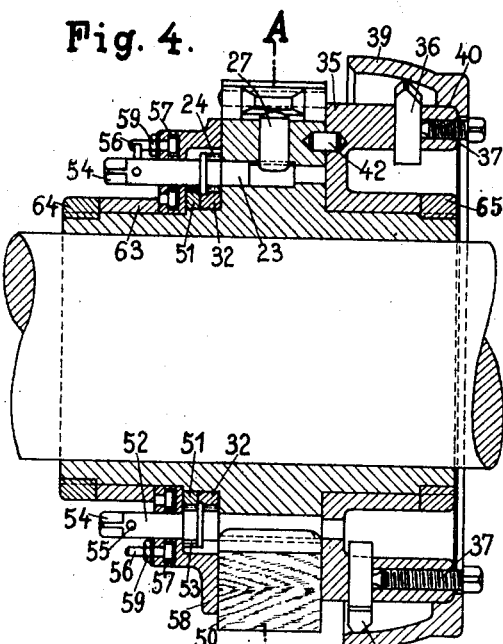
Fig. 4 is an axial section of a modified form of construction, in the case of which several hard wood guide blocks are arranged, intermediate the blades of the reamer head.
Figure 5:
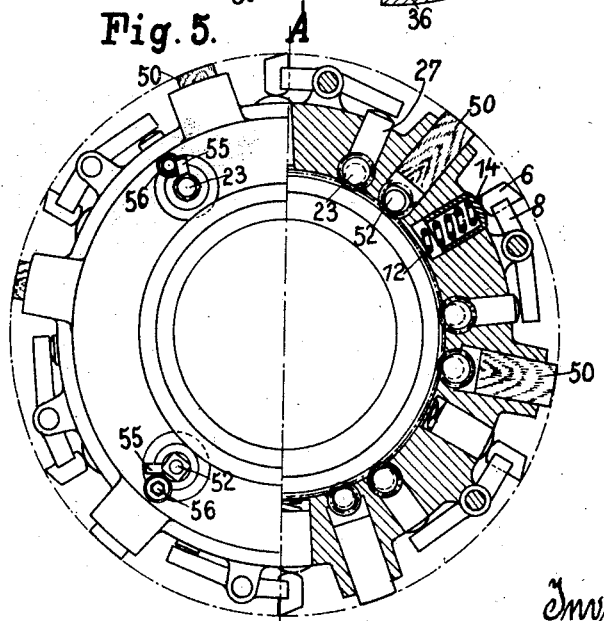
Fig. 5 is a cross section along line A—A in Fig. 4.

To prevent the weight of the reamer head from unfavorably affecting the blades in the case of pendulum reamers heads of large diameter used horizontally, further, to guide the reamer head centrically within the bore, or else in order to secure the proper working of the reamer head in the case of big boring heads, finally, however, to prevent long boring bars, having heavy cutter heads, from sagging, so that even in the case of deep bores there will be secured a satisfactory guiding for the tool, there are provided within the body 4, in accordance with Figs. 4 and 5, or else in a special base portion lodged to the rear of the reamer head several adjustable hard wood guide blocks 50. The setting of these blocks is carried out in a similar manner to that of the blades, though entirely independent of these, so that for the setting of the guide blocks 50 there must be provided a separately disposed toothed rim 51, in connection with bolts 52, axially traversing the tool body. On the last-mentioned bolts there are arranged the tooth-wheels 53, for the purpose of enabling the rotation effected by the toothed rim 51, to be transmitted on to the other bolts 52. The length of the bolts 23 and 52 will extend, generally speaking, only up to the toothed rims 32 and 51, respectively. However, one of the bolts 23, serving for the setting of the blades 6, as well as one of the bolts 52, serving for the setting of the guide blocks 50, is so far extended or prolonged that it may be easily rotated from without.

To this end, the free extremity of the prolonged bolt 23 is formed to constitute a square 54 and one of the bolts 52 has a similar square 54$^a$. In addition, each of these prolonged bolts is provided with a stop pin 55 adapted to bear against a counter pin 56 on the bolt 23 or 52, respectively, being properly adjusted, and thus preventing these said bolts from automatically returning into their initial position. In this arrangement, the pins 56 are inserted in taper circular grooves 57, formed concentrically to the prolonged bolts 23 and 52, respectively, in the cover-plate 58. By aid of nuts 59, the pins may be readily secured in the required position. In the place of the foresaid means for securing the set bolts, however, also, any other means may be employed.

The afore-indicated reamer head can be suitably complemented by the cutter head adjoining it, which acts as a preliminary tool.

In the cutter head (Fig. 1) there are radially disposed in recesses provided for that special purpose, a plurality of cutters 36, each of which is secured in its position by means of a square headed screw 37. The end of each of these cutters 36, which faces the spindle 2, may be provided with a recess in which a coil spring 38 (Fig. 1) is adapted to engage. This spring is arranged for the purpose of forcing the cutters outward so soon as they are released by the screw 37.

Thus the cutters 36 may be set readily and reliably subject to a tempered gauge or template 39, which can be put around the cutter head, to the edge 40 of which it is centered.

The curvature of the inner face of the template, as also its diameter are determined by the fact that the cutters disposed nearest to the blades 6 are intended to bore out the work piece to approximately the diameter desired, whereas the roughing cutters arranged towards the forward free end of the tool serve to turn off larger chips, and are to a certain extent intended to effect the rough drilling of the work piece.

Figure 3:
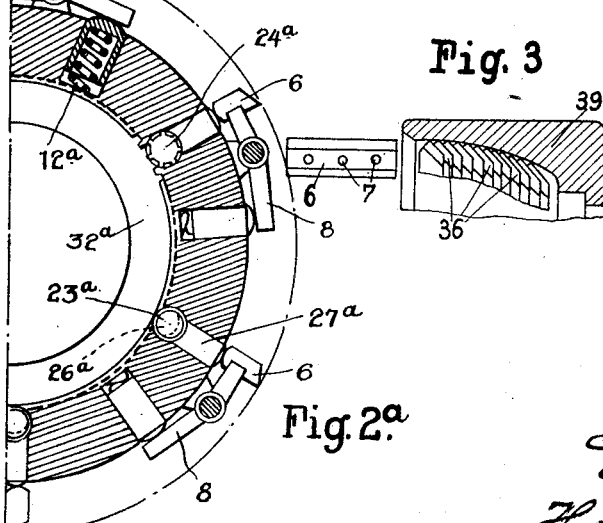

If it be now assumed, that all the cutters have been rotated into a common plane, then they will present the view disclosed in Fig. 3, which shows how the individual cutters are staggered relatively to each other in the axial direction of the cutter head, while being at the same time set at various bore diameters.

For the sake of completeness, let it be added that the centering pins 42 act in the manner of fixing set screws. There is, of course, no objection to likewise centering the cutter head directly on the spindle 2, and to cause it to be taken along by means of a key and slot arrangement. The cutter head 35 is secured in its proper position relatively to the support 4 by means of nuts 65. If preferred, the cutter head may be made integral with said support 4, or else it may be mounted directly on the spindle 2, according to the size of the entire tool.

The manner of operation of the tool is as follows:

First of all the cutters 36 of the preliminary device must be properly set in a well-known manner. Then the bolts 23 of the reamer head must be rotated for such an extent till the blades 6 will be enabled to adjust themselves to the diameter desired.

This having been accomplished, the tool is ready to be inserted into the bore to be turned hollow and suitably finished. In the single operation which now follows, the work piece is successively subjected to a preliminary turning and finally finishing by the different cutters and blades. This feature renders the essential advantage of the improved tool obvious. For by its means, there is not only obtained a substantial saving in time, and an improved utilization of the machines on hand, but in addition the accuracy and nicety of the work is to a considerable degree enhanced.

In case special guide means should be required for the tool during the operation in order to maintain it in a true central position within the bore, then the guide blocks 50 may be brought to bear up against the inner surface of the bore by due rotation of the bolt 52. After the finishing operation has been completed, the blades 6 are retracted from the surface of the bore, before the tool is removed therefrom, by suitable displacement of the bolt 23, and are turned towards the support 4, in order to prevent their damaging the smoothened surface of the bore when the tool is being taken out.

We do not wish to restrict ourselves to the special construction exemplified in the accompanying drawings preferring to reserve the right to legitimately vary, that structure without violating the spirit of the invention.

Having thus described the construction of our tool and indicated its operation, what we claim is the following:

1. In a device of the kind described in combination, a rotary support, bolts removably disposed in radial bores of said support, double-armed levers pivoted to said bolts so as to extend substantially at right angles to the support axis, a cutting blade at one arm of each lever, carried by the same resilient means for forcing said arm outwards and means for varying the distance between the other arm and said support.

2. In a device of the kind described in combination, a rotary support, double-armed levers pivoted circumferentially to said support so as to extend substantially at right angles to the support axis, a cutting blade at one arm of each lever, carried by the same, coil springs disposed in radial bores of said support for forcing said arm outwards and means for varying the distance between the other arm and said support.

3. In a device of the kind described in combination, a rotary support, double-armed levers pivoted circumferentially to said support so as to extend substantially at right angles to the support axis, a cutting blade at one arm of each lever, carried by the same, resilient means for forcing said arm outwards, a bolt loosely disposed in a radial bore of said support below the other arm and excentric means for setting said bolt so as to vary the distance between the other arm and said support.

4. In a device of the kind described in combination, a rotary support, double-armed levers pivoted circumferentially to said support so as to extend substantially at right angles to the support axis, a cutting blade at one arm of each lever carried by the same, resilient means for forcing said arm outwards and means for simultaneously varying the distance between the other arms of all said levers and said support.

5. In a device of the kind described in combination, a rotary support, double-armed levers, pivoted circumferentially to said support so as to extend substantially at right angles to the support axis, a cutting blade at one arm of each lever, carried by the same, resilient means for forcing said arm outwards, a bolt loosely disposed in a radial bore of said support below the other arm, excentric means for setting said bolt so as to vary the distance between the other arm and said support, and means for simultaneously setting all the said excentric means.

6. In a device of the kind described in combination, a rotary support, double-armed levers pivoted circumferentially to said support so as to extend substantially at right angles to the support axis, a cutting blade at one arm of each lever, carried by the same, resilient means for forcing said arm outwards, a bolt loosely disposed in a radial bore of said support below the other arm, excentric means for setting said bolt so as to vary the distance between the other arm and said support, and means comprising a toothed rim for simultaneously operating all the said excentric means.

7. In a device of the kind described in combination, a rotary support, double-armed levers pivoted circumferentially to said support so as to extend substantially at right angles to the support axis, a cutting blade at one arm of each lever carried by the same, resilient means for forcing said arm outwards, a bolt loosely disposed in a radial bore of said support below the other arm, excentric means for setting said bolt so as to vary the distance between the other arm and said support, and means, adapted to be actuated by the work piece, for automatically and simultaneously operating the said excentric means.

8. In a device of the kind described in combination, a rotary support, double-armed levers pivoted circumferentially to said support so as to extend substantially at right angles to the support axis, a cutting blade at one arm of each lever, carried by the same, resilient means for forcing said arm outwards, means for varying the distance between the other arm and said support, and guide blocks adjustably disposed in radial slots of said support.

9. In a device of the kind described in combination, a rotary support, double-armed levers pivoted circumferentially to said support so as to extend substantially at right angles to the support axis, a cutting blade at one arm of each lever, carried by the same, resilient means for forcing said arm outwards, means for varying the distance between the other arm and said support, guide blocks adjustably disposed in radial slots of said support, an excentric bolt extending axially behind each guide block and means for setting all said bolts simultaneously so as to adjust said blocks.

10. In a device of the kind described in combination, a rotary support, double-armed levers pivoted circumferentially to said support so as to extend substantially at right angles to the support axis, a cutting blade at one arm of each lever, carried by the same, resilient means for forcing said arm outwards, a bolt loosely disposed in a radial bore of said support below the other arm, excentric means for setting said bolt so as to vary the distance between the other arm and said support, means for simultaneously setting all the said excentric means, and means for locking said common setting means.

11. In a device of the kind described in combination, a rotary support, double-armed levers pivoted circumferentially to said support so as to extend substantially at right angles to the support axis, a cutting blade at one arm of each lever, carried by the same, resilient means for forcing said arm outwards, a bolt loosely disposed in a radial bore of said support below the other arm, excentric means for setting said bolt so as to vary the distance between the other arm and said support, means for simultaneously setting all the said excentric means, a circular groove in the front face of said support and means adjustable within said groove for locking said common setting means.

12. In a device of the kind described in combination, a rotary support, double-armed levers pivoted circumferentially to said support so as to extend substantially at right angles to the support axis, a cutting blade at one arm of each lever, carried by the same, resilient means for forcing said arm outwards, means for varying the distance between the other arm and said support, guide blocks adjustably disposed in radial slots of said support, an excentric bolt extending axially behind each guide block, means for setting all said bolts simultaneously so as to adjust said blocks and means for locking said common setting means.

13. In a device of the kind described in combination, a rotary support, double-armed levers pivoted circumferentially to said support so as to extend substantially at right angles to the support axis, a cutting blade at one arm of each lever, carried by the same, resilient means for forcing said arm outwards, means for varying the distance between the other arm and said support, a stop pin on one of these means bearing against an adjustable counter pin on the support, guide blocks adjustably disposed in radial slots of said support, an excentric bolt extending axially behind each guide block, means for setting all said bolts simultaneously so as to adjust said blocks.

14. In a device of the kind described in combination, a rotary support, double-armed levers pivoted circumferentially to said support so as to extend substantially at right angles to the support axis, a cutting blade at one arm of each lever, carried by the same, resilient means for forcing said arm outwards, means for varying the distance between the other arm and said support, a cutter head on said support and cutters adjustably disposed in radial indentures of said cutter head.

15. In a device of the kind described in combination, a rotary support, double-armed levers pivoted circumferentially to said support so as to extend substantially at right angles to the support axis, a cutting blade at one arm of each lever, rigid means for forcing said arm outwards, means for varying the distance between this arm and said support and a spring acting upon the other arm of said lever.

In testimony whereof we affix our signatures.

EMIL LEONHARD BAUMANN.
HERMANN SCHUMACHER.